No. 634,162. Patented Oct. 3, 1899.
W. S. BRACKTLE.
PORTABLE WEIGHING SCALE.
(Application filed Mar. 22, 1898.)
(No Model.)
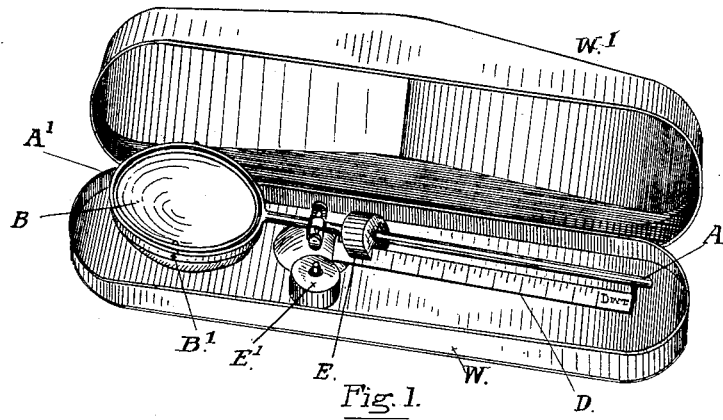
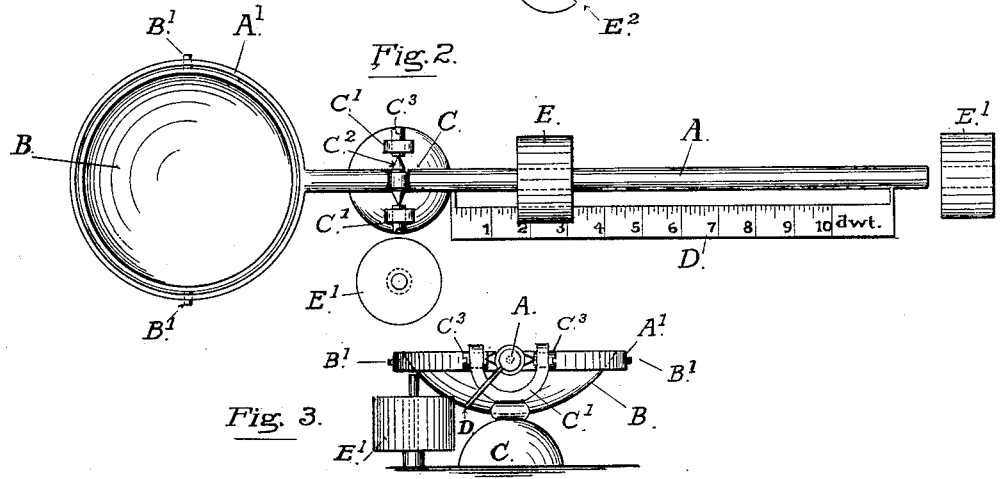
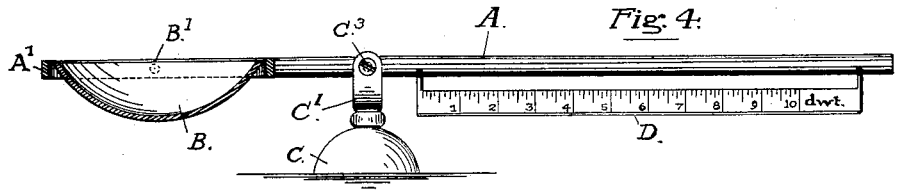
Witnesses:
Inventor:
Wallace S. Bracktle

UNITED STATES PATENT OFFICE.

WALLACE S. BRACKTLE, OF OAKLAND, CALIFORNIA.

PORTABLE WEIGHING-SCALE.

SPECIFICATION forming part of Letters Patent No. 634,162, dated October 3, 1899.

Application filed March 22, 1898. Serial No. 674,825. (No model.)

*To all whom it may concern:*

Be it known that I, WALLACE S. BRACKTLE, a citizen of the United States of America, residing in the city of Oakland, county of Alameda, and State of California have invented certain new and useful Improvements in Pocket Weighing-Scales, of which the following is a specification.

My invention relates to improvements in weighing-scales; and it has for its object mainly the production of pocket or portable scales for the use of miners and assayers to weigh gold and silver.

The improvements constituting the said invention comprise certain novel parts and combination of parts, as hereinafter described, and pointed out in the claim at the end of this specification, reference being had to the accompanying drawings, forming a part hereof.

Figure 1 of the drawings is a view in perspective of my improved scale mounted in a pocket-case. Fig. 2 is a plan or top view of the scale. Fig. $2^a$ is a view in detail of the sliding weight. Fig. 3 is an elevation taken from the right-hand side of Fig. 2 or Fig. 4, and Fig. 4 is a front view in elevation.

A indicates the beam of the scale; B, the pan on the end; C, the fulcrum-block, and C' the fulcrum.

D is the scale-bar or part bearing the divisions of the scale, and E is the sliding weight. The divisions on this bar are graduated to pennyweights and fractions of a pennyweight Troy.

E' is an auxiliary weight that when placed on the outer end of the beam increases the weighing capacity of the scale by one-half of an ounce.

The beam A is a rod having on one end a ring A' and provided with fulcrum-points $C^2$, on which it is suspended and balanced in adjustable bearing-screws $C^3$ between the upright arms of a yoke D or forked standard C', fixed in a bed-block C.

The pan B is formed with a concave or rounded bottom, deepest in the center, and is suspended and balanced on pivots B' B' in the ring A'.

The graduation-marks are made on a flat bar or rail D, that is attached to the rod A so as to stand with a downward inclination along the front of the beam and at an angle that allows the marks to be read easily from above.

The sliding weight E is bored to slide easily on the rod A, and on one side is provided with a slit $E^2$ to admit the scale-bar D. This weight is placed on the rod A before the scale-bar D is attached to the rod, so that the weight is confined on the rod and cannot slip off, while it is free to be moved along the rod. The auxiliary weight E' has a central aperture to fit the outer end of the rod A, which is of sufficient length beyond the end of the scale-bar D to hold this weight when it is used.

For convenience in carrying the scale the base C is mounted on the bottom W of an inclosing case, which is provided with a cover W'.

Having thus fully described my invention, what I claim as new therein, and desire to secure by Letters Patent, is—

The herein-described weighing-scale, comprising a base-block, a beam fulcrumed on the base-block having a yoke on one end, a pan suspended on pivots in the yoke, a scale-bar attached to the beam at the ends to stand at an angle along the front thereof, and a slidable weight composed of a cylindrical block bored to fit and slide on the beam and having a slot in one side adapted to take the edge of the scale-bar, as set forth.

In testimony that I claim the foregoing I have hereunto set my hand and seal.

WALLACE S. BRACKTLE. [L. S.]

Witnesses:
EDWARD E. OSBORN,
M. REGNER.